US009047897B1

(12) United States Patent
Bui et al.

(10) Patent No.: US 9,047,897 B1
(45) Date of Patent: Jun. 2, 2015

(54) LATERAL TAPE MOTION SIGNAL CONDITIONING

(71) Applicant: International Business Machines Corporation, Armonk, NY (US)

(72) Inventors: Nhan X. Bui, Tucson, AZ (US); Randy C. Inch, Tucson, AZ (US); Tomoko Taketomi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/157,101

(22) Filed: Jan. 16, 2014

(51) Int. Cl.
  *G11B 5/584* (2006.01)
  *G11B 5/58* (2006.01)
(52) U.S. Cl.
  CPC ........................................ *G11B 5/58* (2013.01)
(58) Field of Classification Search
  None
  See application file for complete search history.

(56) References Cited

U.S. PATENT DOCUMENTS

| | | | |
|---|---|---|---|
| 5,343,341 A | 8/1994 | Jahren | |
| 5,379,165 A * | 1/1995 | Pahr | 360/78.02 |
| 6,963,467 B2 * | 11/2005 | Bui et al. | 360/77.12 |
| 8,027,121 B2 | 9/2011 | Argumedo et al. | |
| 8,059,362 B2 | 11/2011 | Hancock et al. | |
| 8,526,134 B2 | 9/2013 | Bui et al. | |
| 2003/0016467 A1 | 1/2003 | Bui et al. | |
| 2007/0230033 A1 | 10/2007 | McAllister et al. | |
| 2009/0201604 A1 | 8/2009 | Harper | |
| 2011/0102937 A1 | 5/2011 | Argumedo et al. | |

FOREIGN PATENT DOCUMENTS

JP    2003085720    3/2003

OTHER PUBLICATIONS

Gentilini et al., "Lateral Tape Motion Control With Robust Performance Evaluation Based on RBode Plot," 2011 IEEE, IEEE Transactions on Industrial Electronics vol. 59, No. 10, Oct. 2012, pp. 3971-3978.
Petrek, D., "New Delay-Integration Method for Measurement of Lateral Tape Motion and Study of Tape Performance Under High Speed Conditions," Ohio State University, 2007, pp. 1-86.
Alfano et al., "New technique for monitoring lateral tape motion using a magnetic signal," Microsyst Technol, 2006, vol. 12, Jan. 17, 2006, pp. 565-570.
Petrek et al., "Study of magnitude and component frequency variation of lateral tape motion across an unsupported tape region," Microsyst Technol, 2008, vol. 14, Oct. 18, 2007, pp. 427-438.
U.S. Appl. No. 14/157,078 filed Jan. 16, 2014, (Bui et al.).
Bui et al., U.S. Appl. No. 14/637,317, filed Mar. 3, 2015.

* cited by examiner

*Primary Examiner* — Andrew L Sniezek
(74) *Attorney, Agent, or Firm* — Zilka-Kotab, PC

(57) ABSTRACT

Various embodiments described herein include processing of a lateral tape motion signal, caused primarily by a tape supply reel (e.g., depending on direction of tape movement). The resulting data may be used, at least in part, to determine placement of a coarse actuator. In one general embodiment, a method includes receiving a signal representative of a lateral position of a magnetic head, and integrating portions of the signal representative of a lateral position of a magnetic head, the portions corresponding to fractions of one or more revolutions of a supply reel for generating first data. The first data is averaged over a value or values corresponding to one or more revolutions of the supply reel for generating second data.

20 Claims, 14 Drawing Sheets

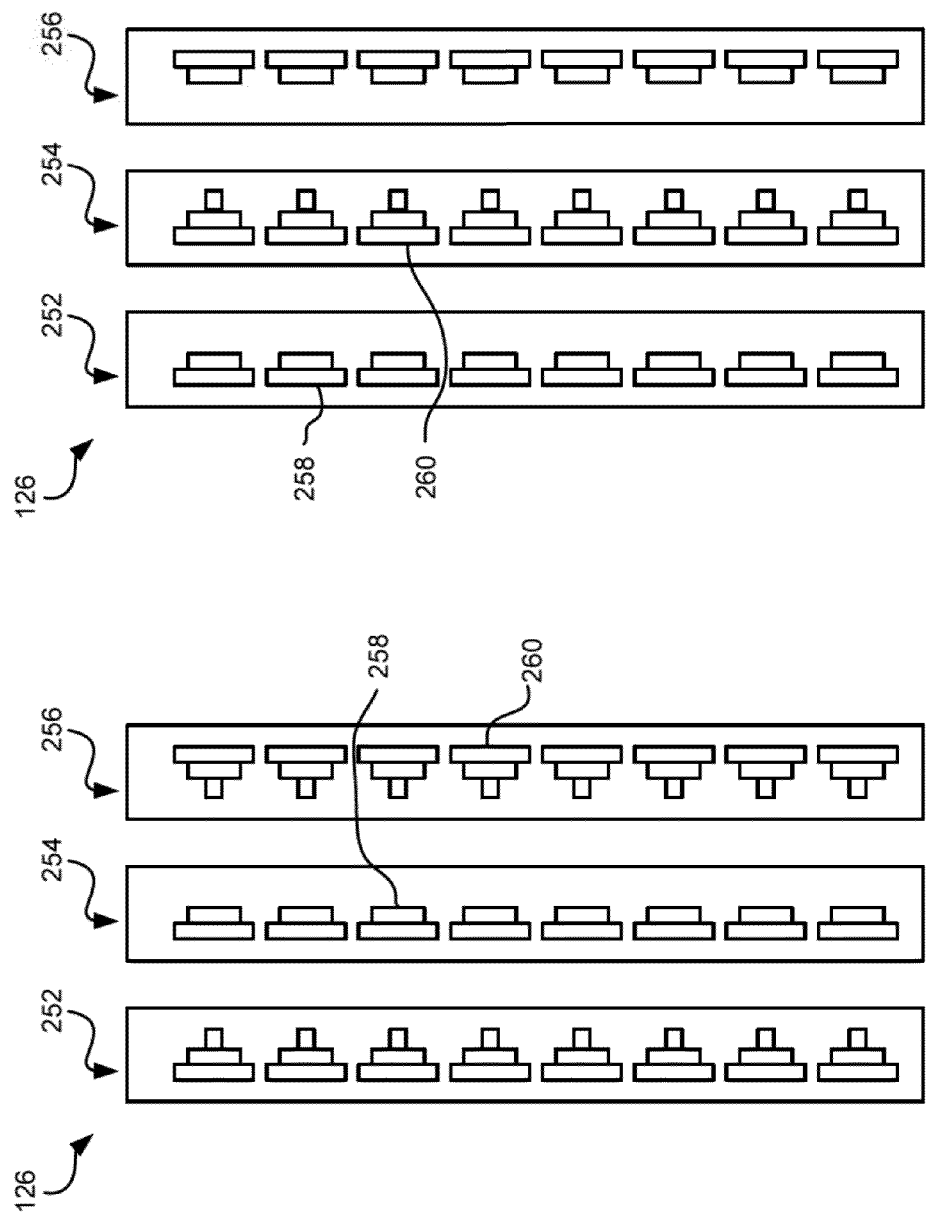

LATERAL TAPE MOTION SIGNAL CONDITIONING

BACKGROUND

The present invention relates to data storage systems, and more particularly, this invention relates to systems and methods for performing signal processing to determine placement of a coarse actuator.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

BRIEF SUMMARY

An apparatus according to one embodiment includes a controller configured to receive a signal representative of a lateral position of a magnetic head, and integrate portions of the signal representative of a lateral position of a magnetic head, the portions corresponding to fractions of one or more revolutions of a supply reel for generating first data. The controller is also configured to average the first data over a value or values corresponding to one or more revolutions of the supply reel for generating second data.

A method according to one embodiment includes receiving a signal representative of a lateral position of a magnetic head, and integrating portions of the signal representative of a lateral position of a magnetic head, the portions corresponding to fractions of one or more revolutions of a supply reel for generating first data. The first data is averaged over a value or values corresponding to one or more revolutions of the supply reel for generating second data.

A computer program product according to one embodiment includes a computer readable storage medium having program code embodied therewith, the program code readable/executable by a controller to perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. Various embodiments described herein include processing of a lateral tape motion signal, caused primarily by a tape supply reel (e.g., depending on direction of tape movement). The resulting data may be used, at least in part, to determine placement of a coarse actuator as will be described in further detail below.

In one general embodiment, an apparatus includes a controller configured to receive a signal representative of a lateral position of a magnetic head, and integrate portions of the signal representative of a lateral position of a magnetic head, the portions corresponding to fractions of one or more revolutions of a supply reel for generating first data. The controller is also configured to average the first data over a value or values corresponding to one or more revolutions of the supply reel for generating second data.

In another general embodiment, a method includes receiving a signal representative of a lateral position of a magnetic head, and integrating portions of the signal representative of a lateral position of a magnetic head, the portions corresponding to fractions of one or more revolutions of a supply reel for generating first data. The first data is averaged over a value or values corresponding to one or more revolutions of the supply reel for generating second data.

In yet another general embodiment, a computer program product includes a computer readable storage medium having program code embodied therewith, the program code readable/executable by a controller to perform the foregoing method.

Figure 1A:
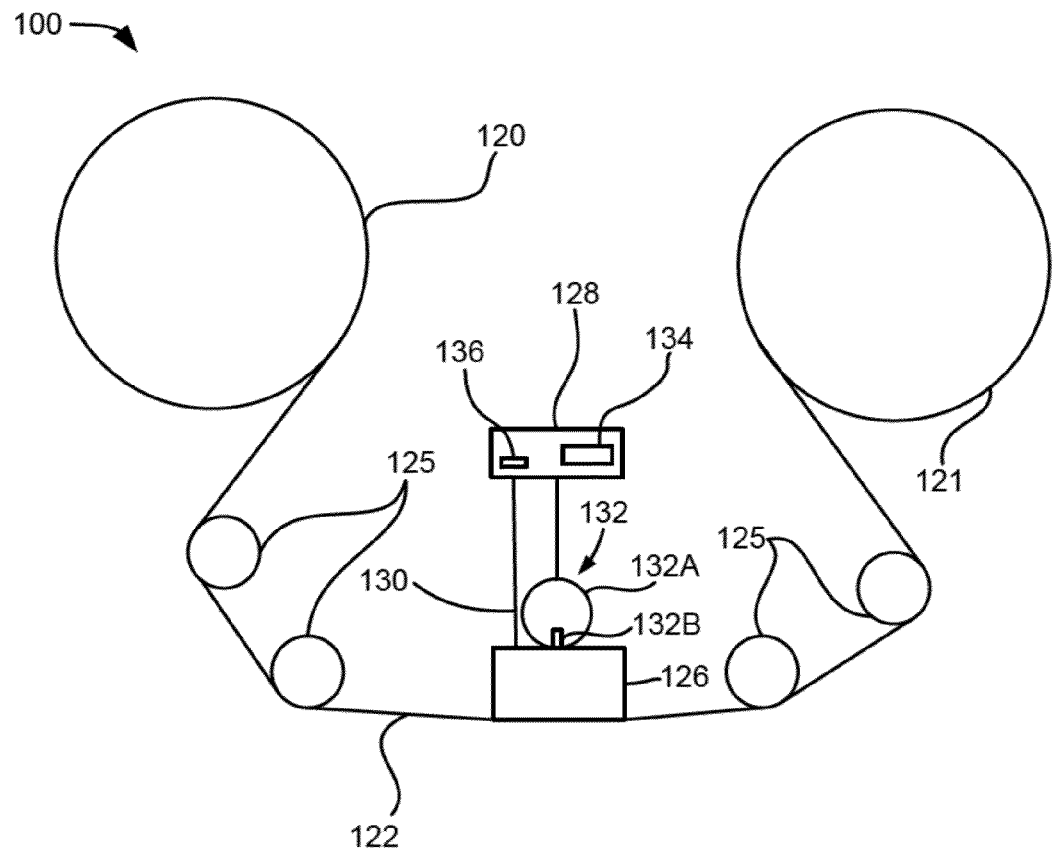
FIG. 1A is a schematic diagram of a simplified tape drive system according to one embodiment.

FIG. 1A illustrates a simplified tape drive system 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

However, as the tape 122 is unwound from a supply reel (e.g., tape supply cartridge 120), lateral motion of the tape across the magnetic tape head 126 can generally be caused by a reel runout effect and/or flange shifts. The reel runout effect results from wobbles of the rotational motion of a motor used to unwind the tape 122 from a supply reel 120. Thus, the reel runout effect repeats with each rotation of the supply reel 120, and appears sinusoidal in nature, as will be discussed in further detail below.

Moreover, flange shifts occur when a tape 122 shifts from being positioned against one of the supply reel flanges to the other flange while being unwound therefrom. The distance separating the flanges of the supply reel is generally larger than the width of the tape 122 in the crosstrack direction. Thus, as the tape 122 is wound onto the supply reel, the tape 122 is generally pressed against one of the two flanges and may shift from being positioned against one flange to the other flange multiple times throughout the length of the tape.

As a result, when the tape 122 is unwound, the shifts between flanges create large lateral shifts of the tape's position across the magnetic tape head 126.

Therefore, the tape drive system 100 preferably includes a mechanism for generating a signal representative of the lateral position of the magnetic head 126 with respect to the tape 122, e.g., a Lateral Tape Motion (LTM) signal. According to various approaches, the mechanism may include the controller 128, an electronic computing device, a signal generator, an arbitrary waveform generator, a digital pattern generator, a frequency generator, etc. Moreover, the LTM signal may be used for positioning the tape head 126 such that a target track of the tape is about directly below the tape head 126, e.g., for reading therefrom and/or writing thereto, as will be described in further detail below.

Guides 125 guide the tape 122 across the tape head 126. Such tape head 126 is in turn coupled to a controller 128 via a cable 130. The controller 128 may be or include a processor and/or any logic for controlling any subsystem of the drive 100. For example, the controller 128 typically controls head functions such as servo following, data writing, data reading, etc.

With continued reference to FIG. 1A, the controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof. According to one embodiment, the controller 128 may perform one or more operations for receiving and/or processing an LTM signal, as will be discussed in further detail below.

The cable 130 may include read/write circuits to transmit data to the head 126 to be recorded on the tape 122 and to receive data read by the head 126 from the tape 122. An actuator 132 controls position of the head 126 relative to the tape 122, and may be of conventional design. The actuator 132 includes a coarse actuator 132A and a fine actuator 132B. The coarse actuator 132A is configured to position the fine actuator 132B and head 126 towards a target track on the medium. The fine actuator 132B is then used for fine track following during operation.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
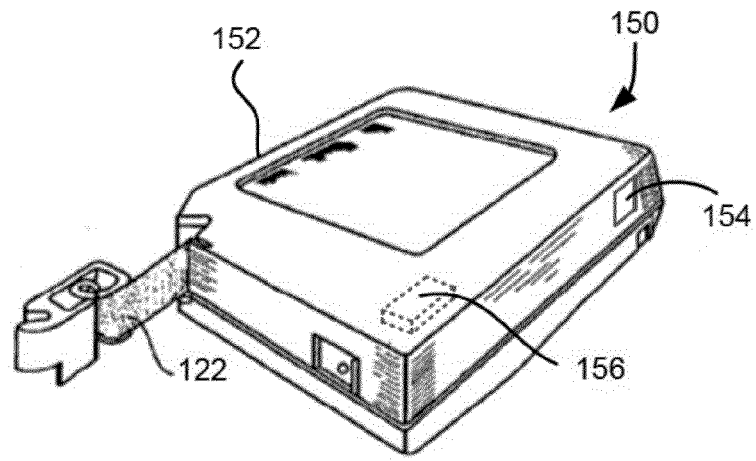
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
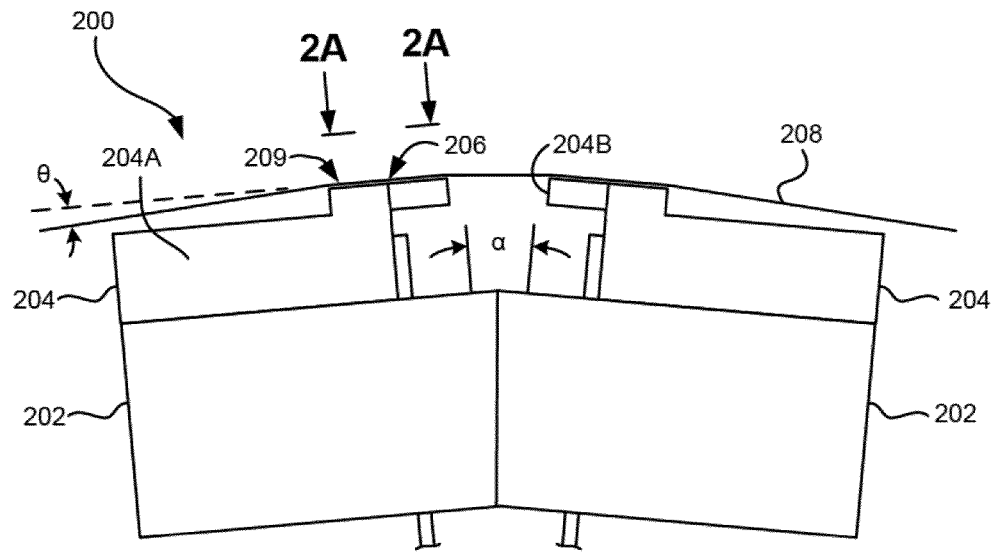
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
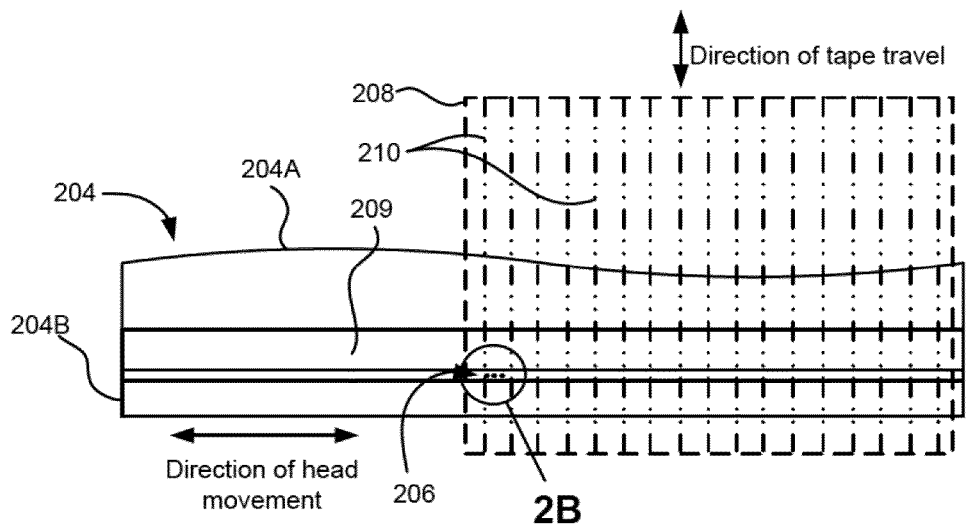
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
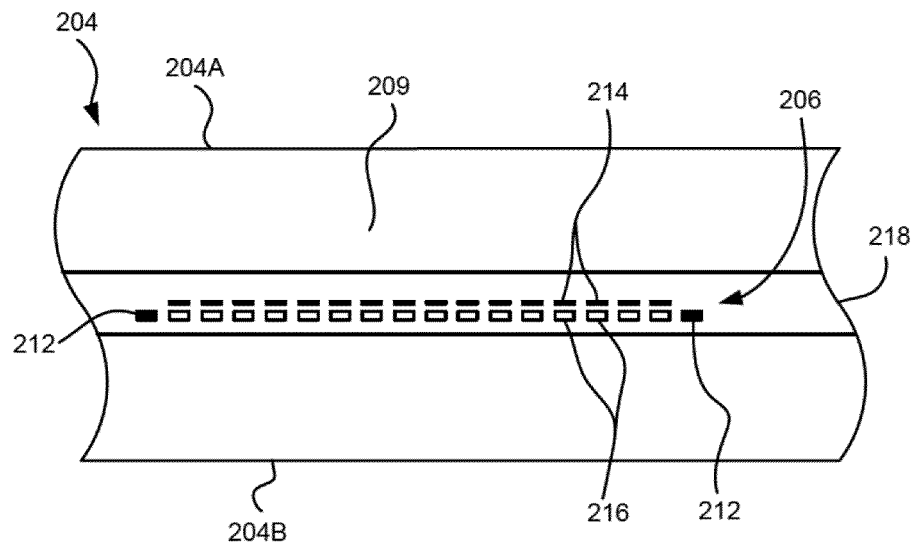
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
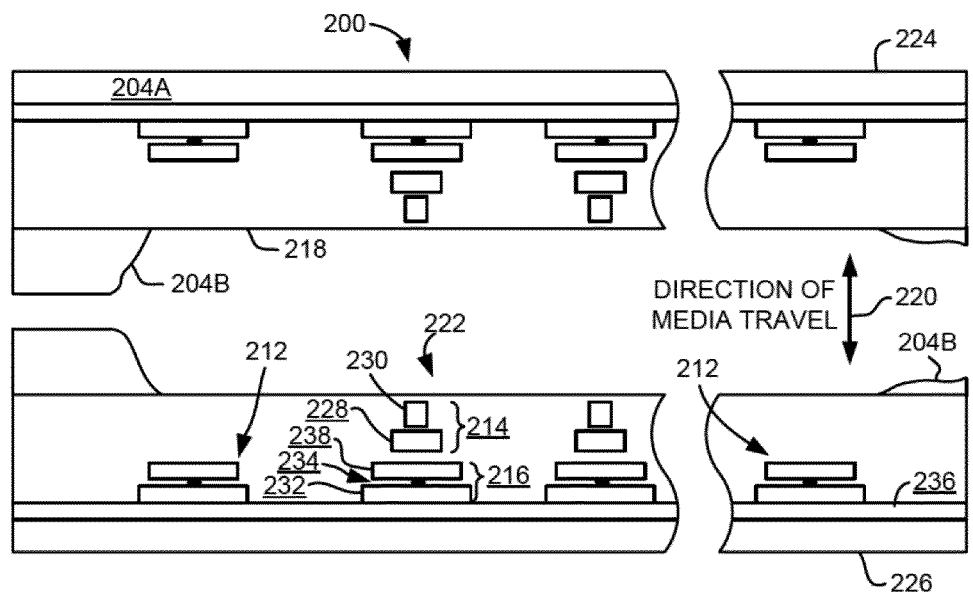
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR. AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
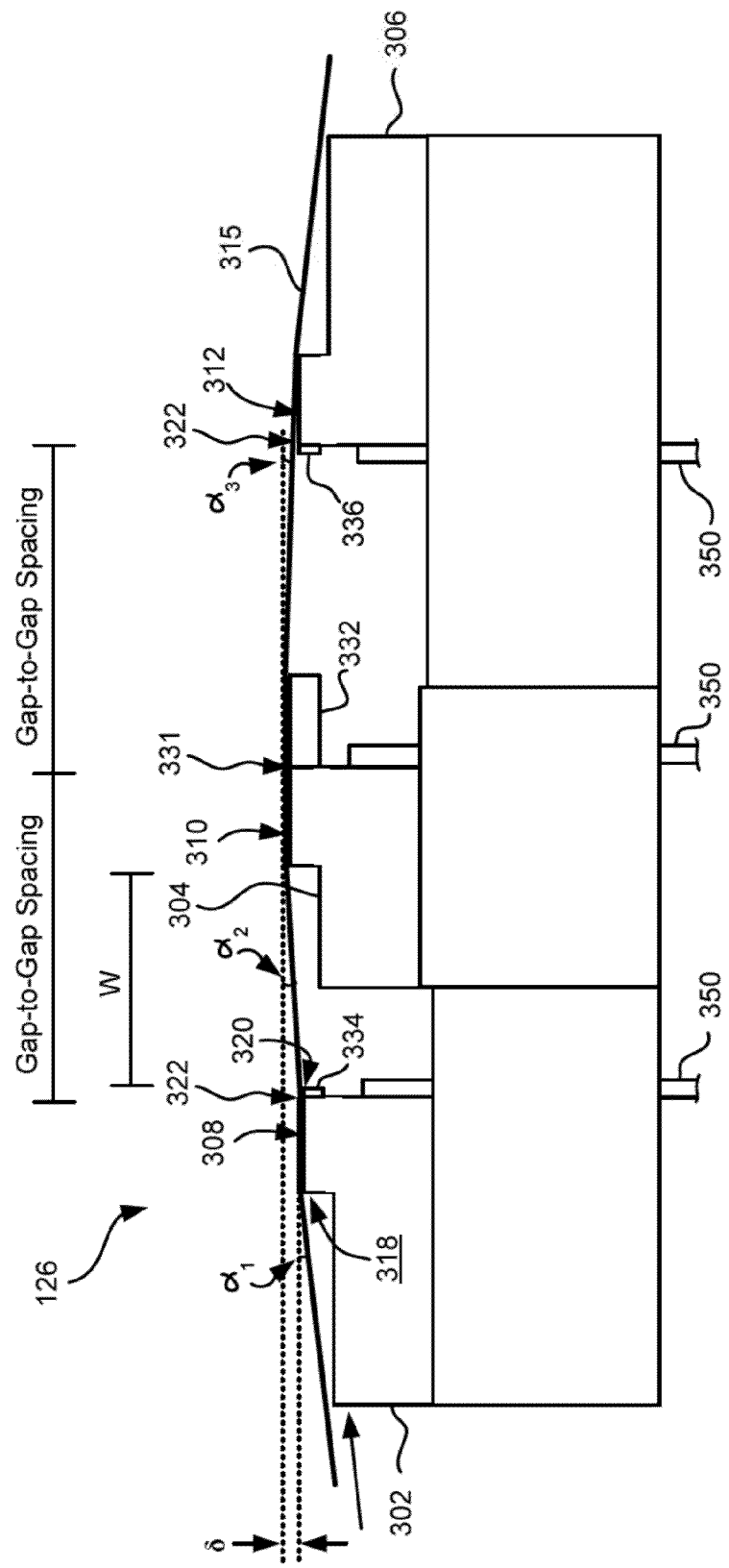
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
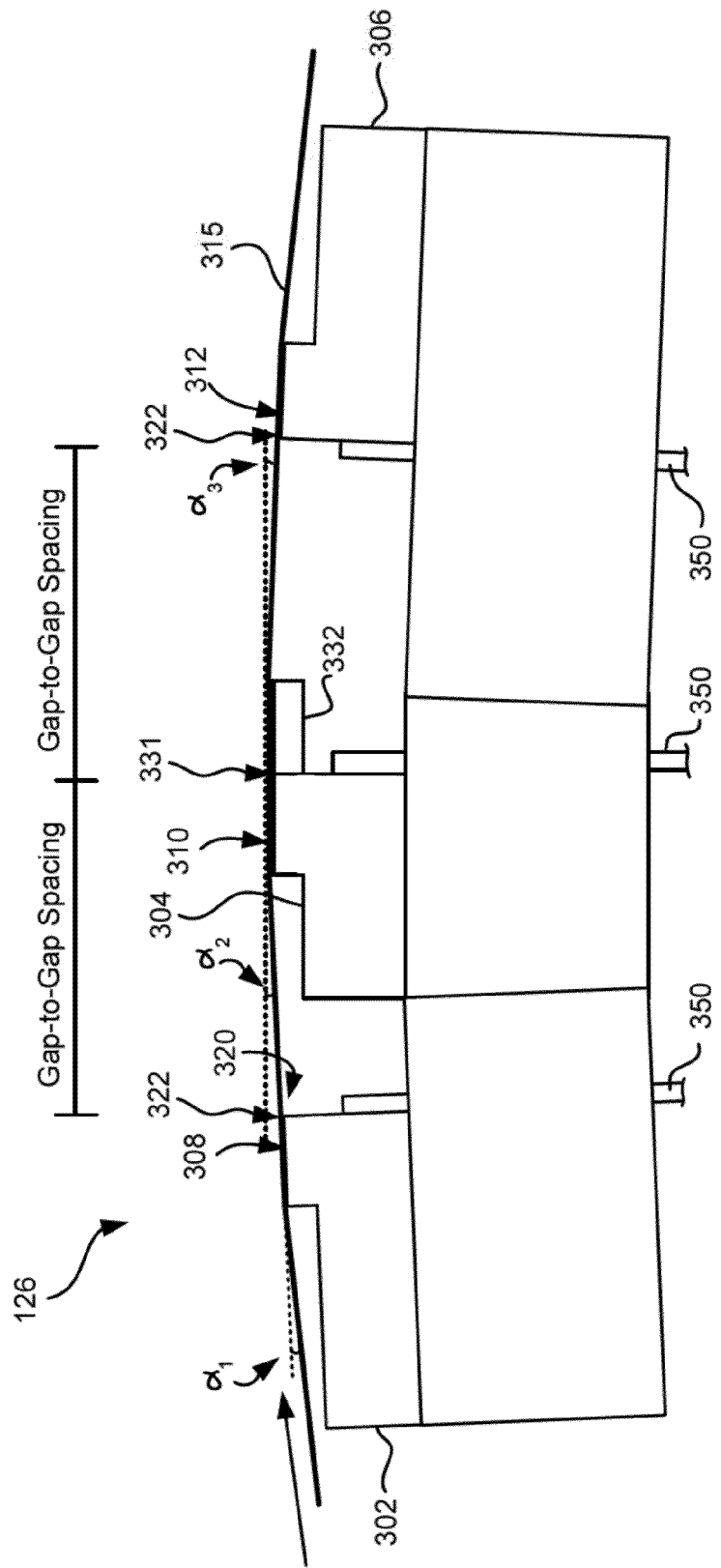
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g. between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
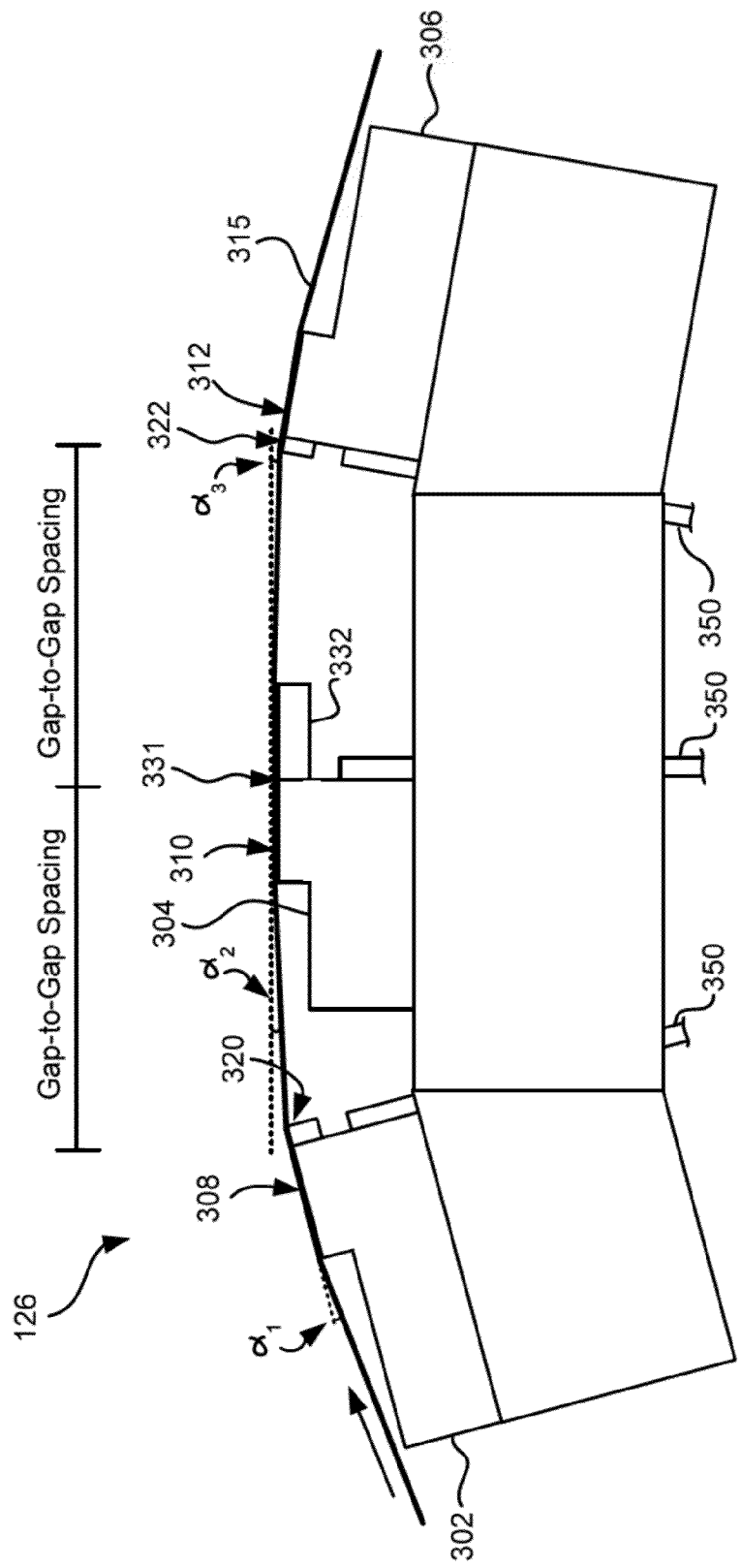
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles at may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

As tape drive storage capacity continues to improve, corresponding track densities rapidly increase. It follows that precise track following servo systems are preferably paired with increased track densities to minimize runtime errors. As described above, some embodiments incorporate a combination of coarse and/or fine actuators for track following with a magnetic head during operation (e.g. see 132A, 132B of FIG. 1A respectively). Preferably, track following is able to determine the position of the tape from an LTM signal, and position the magnetic head at about the center of a target track despite potential lateral offset of the tape. Thus, the short stroke and high bandwidth of the fine actuator may follow the lateral transitions of the tape during runtime, without the risk of running out of stroke.

However, deriving an LTM signal which is an accurate representation of the actual lateral transitions of the tape, and determining the center of the LTM signal has eluded conventional products. In sharp contrast, various embodiments described herein include systems and/or methods of achieving data that may be used to determine accurate placement of a coarse actuator and/or a magnetic head, e.g., during nm time, as will be described in further detail below.

Figure 8:
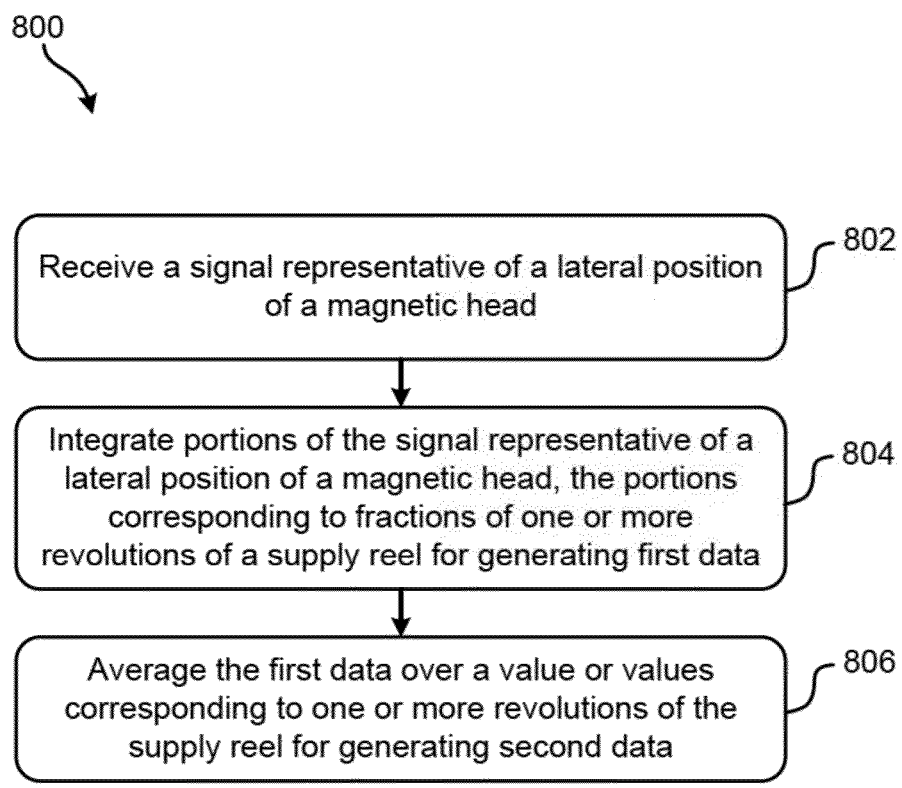
FIG. 8 is a flowchart of a method, according to one embodiment.

FIG. 8 depicts a method 800 in accordance with one embodiment. As an option, the present method 800 may be implemented in conjunction with features from any other embodiment listed herein, such as those described with reference to the other FIGS. Of course, however, such method 800 and others presented herein may be used in various applications and/or in permutations which may or may not be specifically described in the illustrative embodiments listed herein. Further, the method 800 presented herein may be used in any desired environment. Thus FIG. 8 (and the other FIGS.) should be deemed to include any and all possible permutations.

In one approach, which is in no way intended to limit the invention, a controller may be used to perform one or more process steps for producing data which may be derived from an LTM signal. According to an exemplary embodiment, one or more of the operations of method 800 may be performed by the controller 128 of FIG. 1A. It should also be noted that "data" as used herein may include digital and/or analog data, which may be represented by a signal, a value or values, etc.

Looking now to FIG. 8, the method 800 includes receiving a signal representative of a lateral position of a magnetic head, e.g., relative to a tape passing thereby. See operation 802. According to the present description, the "signal" is preferably an LTM signal, but may include other types of signals that are representative of a lateral position of a magnetic head, depending on the desired embodiment. Moreover, referring back to FIG. 1A, the controller 128 may receive the signal (e.g., an LTM signal) representative of a lateral position of the magnetic head 126.

According to different approaches, the signal may be received from a driver circuit of the fine actuator, a photo sensor, an edge beam sensor, an integrator signal from a fine actuator compensator, etc. In preferred approaches, the signal is received from the fine actuator compensator, which corresponds to the integrator signal. However, in other approaches, the signal may correspond to the fine actuator current which represents the particular motions of the fine actuator to follow lateral tape motion of a tape as it traverses across the magnetic head.

As described above, as tape is being unwound from a supply reel, lateral motion of the tape across a magnetic head can generally be caused by a reel nmout effect and/or flange shifts (e.g., among other effects). The reel runout effect results from wobbles of the rotational motion of a motor used to unwind the tape from a supply reel, and will be discussed in further detail below.

Moreover, flange shifts occur when a tape shifts from being positioned against one of the supply reel's flanges to the other flange while being unwound from the supply reel. This generally occurs because the distance separating the flanges of the supply reel is larger than the width of the tape in the crosstrack direction and/or the flanges themselves are tapered. Thus, as the tape is wound onto the supply reel during some previous operation, the tape is generally pressed against one of the two flanges and may shift from being positioned against one flange to the other flange. Consequently, when the tape is unwound, the shifts between flanges create a large lateral motion of the tape as it is being nm across a magnetic head.

With continued reference to FIG. 8, the method 800 further includes integrating portions of the signal representative of a lateral position of a magnetic head, the portions corresponding to fractions of one or more revolutions of a supply reel for generating first data. See operation 804. In some approaches, portions of the signal may be integrated for some fractions of some revolutions of the supply reel, e.g., every other fraction, every third fraction, every fifth fraction, etc. of every revolution, every other revolution, every fourth revolution, etc., and/or combinations thereof. However, in preferred approaches, the portions of the signal are integrated for each fraction of each revolution of the supply reel. Thus, according to an exemplary embodiment which is in no way intended to limit the invention, if a tape supply reel has 24 portions (e.g., hall counts) for each full revolution thereof, operation 804 preferably includes integrating 24 portions of the signal corresponding to the 24 portions of the full revolution of the supply reel.

As will be described in further detail below, integrating the portions of the signal, desirably removes high frequency noise is from the LTM signal. Thus, the first data may include a more accurate representation of the position of tape with respect to a magnetic head at a given point in time and/or a position along a length of a tape. Moreover, according to various approaches, the fractions of each revolution of a supply reel may correspond to a predefined number of hall counts, e.g., 1, 2, etc. hall counts, as will soon become apparent.

Referring still to FIG. 8, operation 806 of the method 800 includes averaging the first data over a value or values corresponding to one or more revolutions of the supply reel for generating second data. According to various approaches, such value or values of operation 806 may correspond to a number of hall counts per revolution, a temporal value that corresponds to a measure of rotation of the supply reel, etc.

In one embodiment, the first data may be averaged over each revolution of the supply reel, e.g., each consecutive, full revolution. However, in other embodiments, the first data may be averaged over each two revolutions, three revolutions, multiple revolutions, etc. Further still, the first data may be averaged over every other full revolution, every other two full revolutions, periodically, upon receiving a request, etc. and/or combinations thereof, depending on the desired embodiment.

Averaging the first data desirably removes a reel runout effect from the LTM signal. As described above, the reel runout effect undesirably causes a shift in tape position relative to the head at a frequency directly corresponding to a rotational frequency of the supply reel and/or motor. Thus, by successfully removing the reel runout effect, the second data is representative of flange shifts of a tape being unwound from the supply reel, as will be described in further detail below.

It should also be noted that, in the method 800 of FIG. 8, the first and/or second data may be processed as digital and/or analog data. Moreover, digital and/or analog data may be represented by a signal, a value or values, etc. depending on the desired embodiment. Therefore, although data may be presented herein using graphs, in other embodiments the first and/or second data may correspond to digital and/or analog data stored in a lookup table, presented to a user, etc.

Figure 9A:
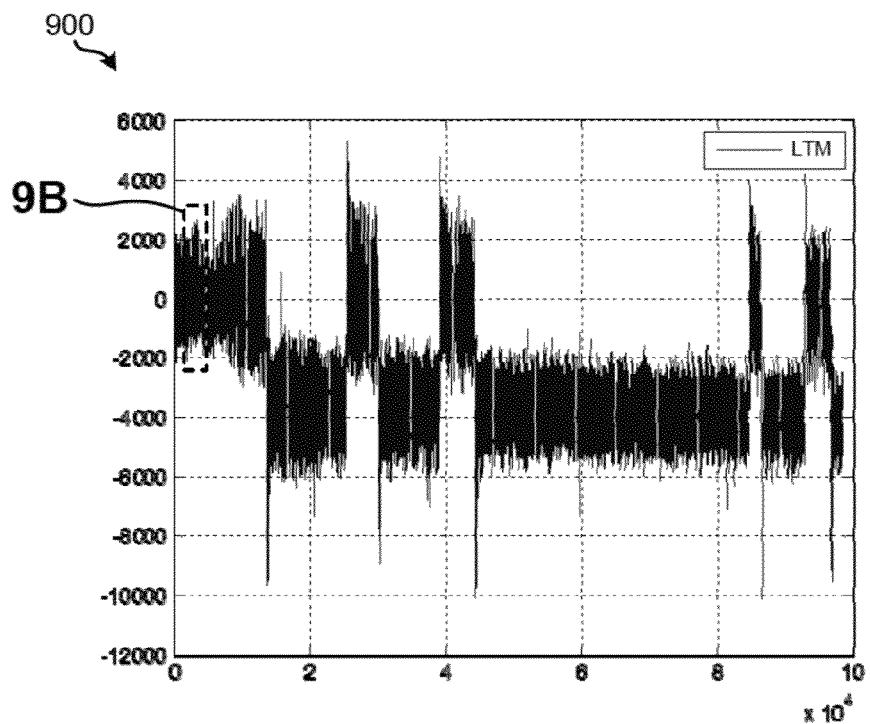
FIG. 9A is a graph of a signal, according to one embodiment.
Figure 9B:
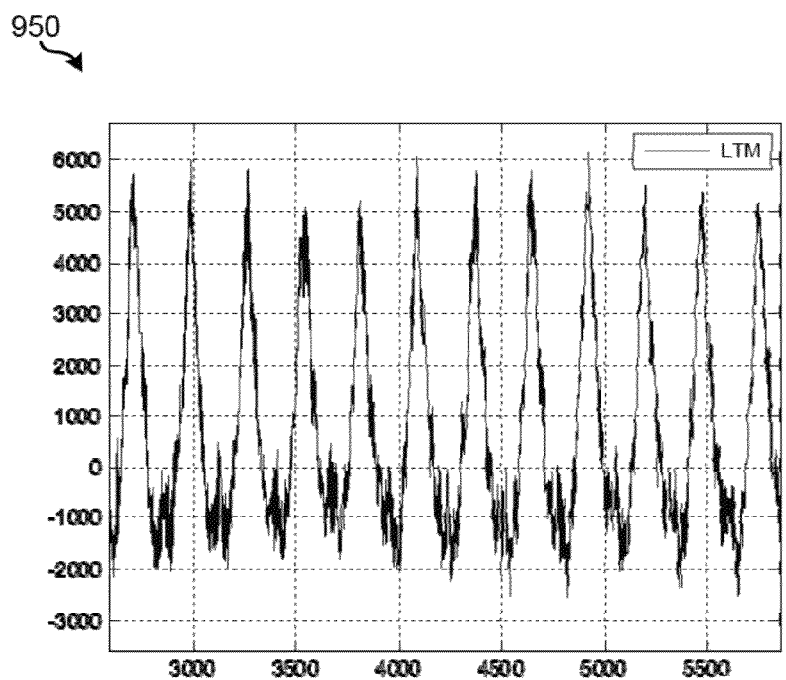
FIG. 9B is a graph with a more detailed representation of the signal of FIG. 9A.

Looking now to FIGS. 9A-9B, graphs 900, 950 illustrate an exemplary integrator signal generated by the inventors from a fine actuator compensator for a number of computation cycles (x-axis), e.g., in the drive in accordance with one embodiment. Of course, however, such graphs 900, 950 and others presented herein may correspond to various applications and/or in permutations which may or may not be specifically described in the illustrative embodiments listed herein.

Referring to FIG. 9A, the relatively high frequency plot 900 shows shifts between a higher value range centered at about 0 on the y-axis, to a lower value range centered at about −4000 on the y-axis. These shifts between value ranges along the y-axis illustrate the effects of flange shifts and the result they have on an LTM signal, e.g., the lateral position of the tape relative to a magnetic head.

However, a more detailed view of the plot in graph 900 reveals a generally periodic sinusoidal curve as seen in the graph 950 of FIG. 9B. Aside from the noise of the plotted signal, the inventors found that the periodical sinusoidal curve matches the rotational frequency of the supply reel used to unwind tape in the present embodiment. Therefore, this periodical sinusoidal curve illustrates the effect that wobble of the motor and/or supply reel has on the LTM signal as described above. It should also be noted that similar effects are experienced when the tape is moving in the opposite direction, e.g., when wound back onto the initial supply reel. For example, referring back to FIG. 1A, when the tape is wound from the take-up reel 121 back onto the supply reel 120, the take-up reel 121 may effectively serve as the supply reel, while the supply reel 120 may effectively serve as the take-up reel.

With continued reference to the graph 950 of FIG. 9B, the noise of the plotted LTM signal may be removed by integrating portions of the signal as described above with reference to operation 804. Moreover, the portions of the signal preferably correspond to fractions of one or more revolutions of a supply reel, e.g., for one or more hall counts. According to the signal illustrated in FIG. 9B, the inventors used an embodiment having hall sensors, e.g., to control the velocity of the motors which wound and/or unwound the tape, with 24 hall counts for each full revolution of the supply reel.

As a result, by integrating 24 portions of the signal illustrated in FIGS. 9A-9B for each revolution of the supply reel, first data is generated. Looking to FIG. 10, the graph 1000 illustrates the step-wise representation of the LTM signal after being integrated over each of the 24 portions. The x-axis represents a number of computation cycles. However, as described above, "data" as used herein may include digital and/or analog data, which may be represented by a signal, a value or values, etc. Therefore, although the first data is presented as a graph, in other embodiments the first data may correspond to digital and/or analog data stored in a lookup table, presented to a user, etc. Moreover, the same is true for the second data as described above.

Figure 11A:
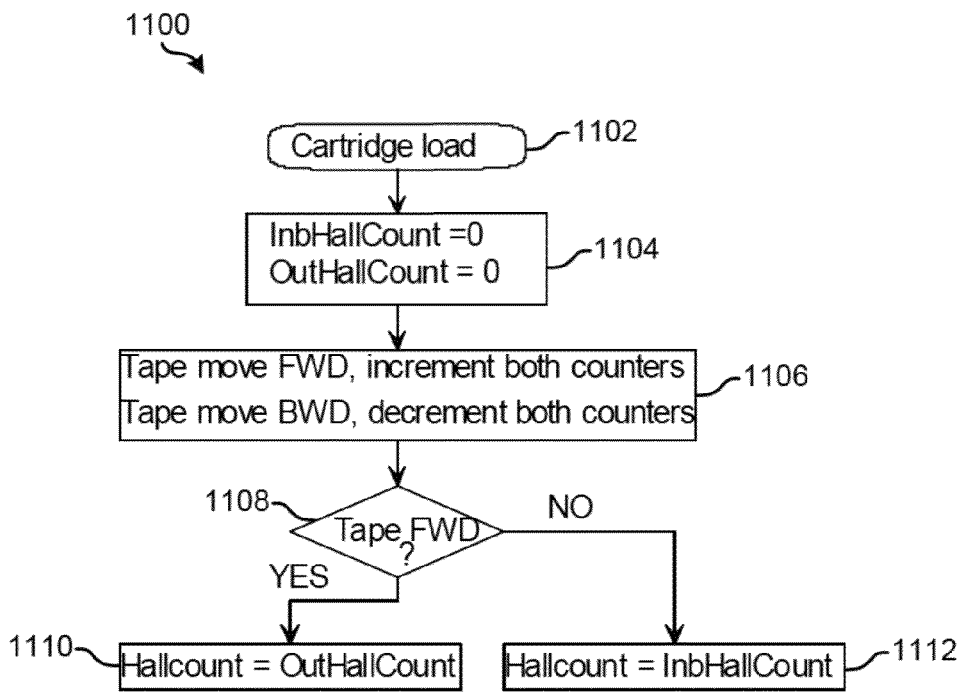
FIG. 11A is a flowchart of a method, according to one embodiment.
Figure 11B:
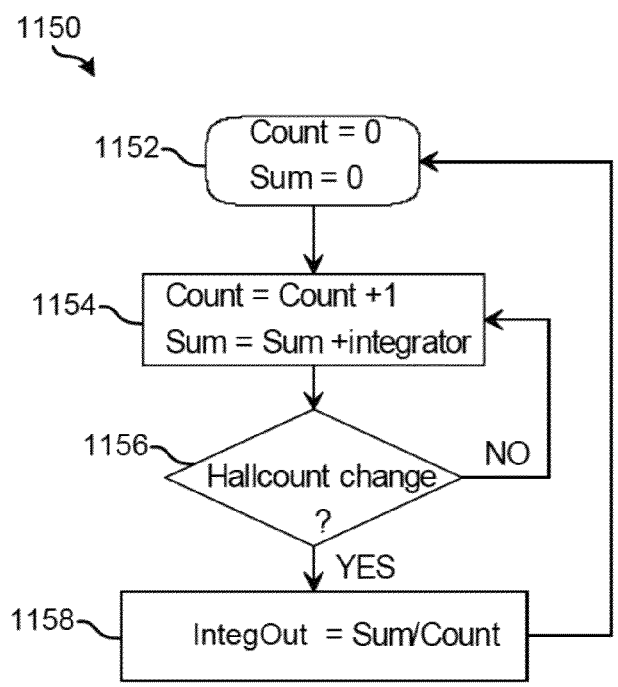
FIG. 11B is a flowchart of a method, according to one embodiment.

According to various embodiments, integrating portions of a signal representative of a lateral position of a magnetic head (e.g., an LTM signal), may include any number of process steps and/or methods. According to an exemplary embodiment, which is in no way intended to limit the invention, FIGS. 11A-11B illustrate flow charts 1100, 1150 of process steps for integrating portions of a signal (e.g., an LTM signal). As an option, the present flow charts 1100, 1150 may be implemented in conjunction with features from any other embodiment listed herein, such as those described with reference to the other FIGS. Of course, however, such flow charts 1100, 1150 and others presented herein may be used in various applications and/or in permutations which may or may not be specifically described in the illustrative embodiments listed herein. Further, the flow charts 1100, 1150 presented herein may be used in any desired environment. Thus FIGS. 11A-11B (and the other FIGS.) should be deemed to include any and all possible permutations.

Looking to FIG. 114, the flow chart 1100 includes loading a cartridge, e.g., a supply reel tape cartridge, as seen in operation 1102. Moreover, when a cartridge is loaded into a drive, both the inboard hall count (InbHallCount) and outboard hall count (OutHallCount) are initialized to 0. See operation 1104.

As tape moves in the forward (FWD) direction (e.g. from the supply reel to the take-up reel), both the InbHallCount and OutHallCount counters are incremented respectively. See operation 1106. The InbHallCount and OutHallCount are preferably incremented as each of the hall transitions of the supply reel and the take-up reel are reached during rotation thereof. It should be noted that the hall transitions of the take-up reel transition quicker when more tape is located on the supply reel, as the take-up reel has smaller radius than the supply reel. However, once more than half of the tape is wound onto the take-up reel, the opposite is true and the hall transitions of the supply reel transition quicker than those of the take-up reel.

Similarly, with continued reference to operation 1106, as the tape moves in the backward (BWD) direction (e.g., from the take-up reel to the supply reel), both the InbHallCount and OutHallCount are decremented respectively as the hall transitions of the supply reel and the take-up reel are reached during rotation thereof.

Looking to decision 1108, the effective supply reel is determined based on the direction of tape travel. As mentioned above, referring back to FIG. 1A, when the tape is wound from the take-up reel 121 back onto the supply reel 120, the take-up reel 121 may effectively be serving as the supply reel, while the supply reel 120 may effectively be serving as the take-up reel. Thus, with continued reference to decision 1108 of FIG. 11A, if the tape is moving in the forward FWD direction, the flow chart 1100 continues to operation 1110 and OutHallCount serves as the Hallcount. Alternatively, if the tape is not moving in the forward FWD direction, the flow chart 1100 continues to operation 1112 and InbHallCount serves as the Hallcount.

Referring now to FIG. 11B, the flow chart 1150 integrates portions of the signal, e.g., using the Hallcount determined in flow chart 1100. As described above, the portions of the signal according to the present embodiment are preferably integrated over each of the 24 hall counts for each revolution of the supply reel, but are not limited thereto. For example, in other embodiments, each revolution of a supply reel may correspond to 1, 5, 12, 48, 100, etc. hall counts.

Operation 1152 of the flow chart 1150 includes initializing both Count and Sum to 0. Moreover, operation 1154 includes incrementing the value of Count by 1. As illustrated, operation 1154 also includes adding the instantaneous value of the LTM signal (integrator) to the Sum.

Decision 1156 determines whether the value of Hallcount has changed (e.g., if a new hall count has been reached). If the value of Hallcount has not changed, the flow chart 1150 returns to operation 1154 where the Count is again incremented by 1, and the instantaneous value of the LTM signal is added to the Sum. However, if the value of Hallcount has changed, the flow chart 1150 moves to operation 1158 where the IntegOut is set to the value of Sum/Count. The flow chart 1150 may then return to operation 1152, where both Count and Sum are reinitialized to 0. Thus, the value of IntegOut represents first data corresponding to integrated portions of an LTM signal representative of a lateral position of a magnetic head (e.g., as described above with reference to operation 804 of FIG. 8).

Figure 10:
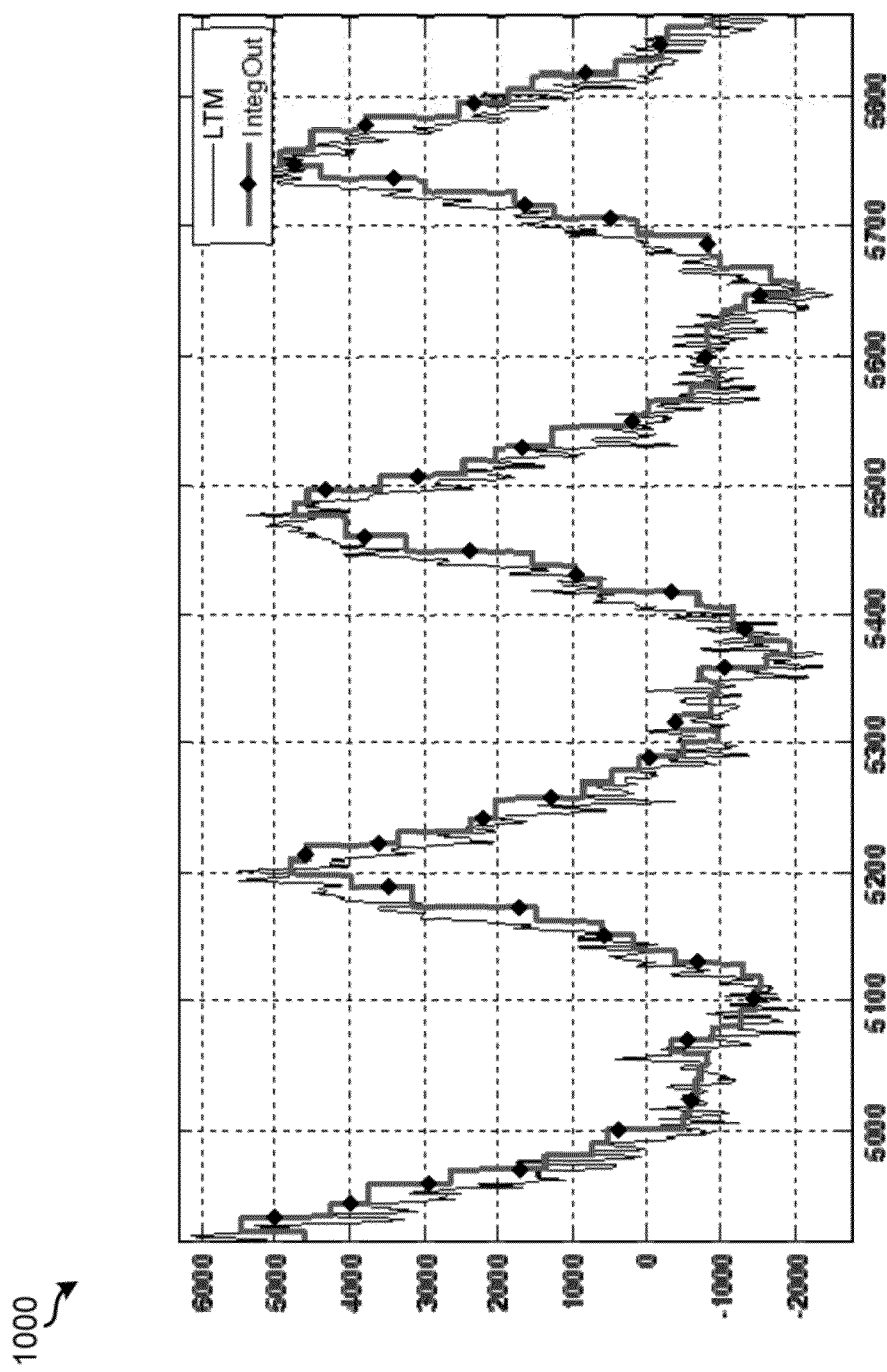
FIG. 10 is a graph of a signal, according to one embodiment.

Looking again to the graph 1000 of FIG. 10, the inventors developed the step-wise representation of the LTM signal using the IntegOut values generated from the LTM signal plotted in FIGS. 9A-9B using the processes depicted in the flow charts 1100, 1150.

As described above, the inventors used an embodiment having hall sensors with 24 hall counts for each full revolution of the supply reel to generate the LTM signal of FIGS. 9A-9B. Thus, looking to the graph 1000 of FIG. 10, step-wise representation of the LTM signal includes 24 steps for each period (e.g., which corresponds to each full rotation of the supply reel). However, other embodiments having a different number of hall counts and/or which do not integrate over each hall count may produce data having a different representation of the LTM signal.

By integrating the portions of the LTM signal, the inventors were able to desirably remove the high frequency noise from the LTM signal, and achieve a low frequency depiction of the reel runout effect. Thus, the data plotted on the graph 1000 (e.g., the first data) may include a more accurate representation of the position of tape with respect to a magnetic head at a given point in time and/or a position along a length of tape.

Moreover, the data plotted on the graph 1000 (e.g., the first data) may be averaged over a value or values corresponding to one or more revolutions of a supply reel, to remove the reel runout effect. As described above, the reel runout effect undesirably causes a shift in tape position relative to the head at a frequency directly corresponding to a rotational frequency of the supply reel. Thus, by successfully removing the reel runout effect, the corresponding data may desirably be representative of flange shifts of a tape being unwound from the supply reel.

Figure 12:
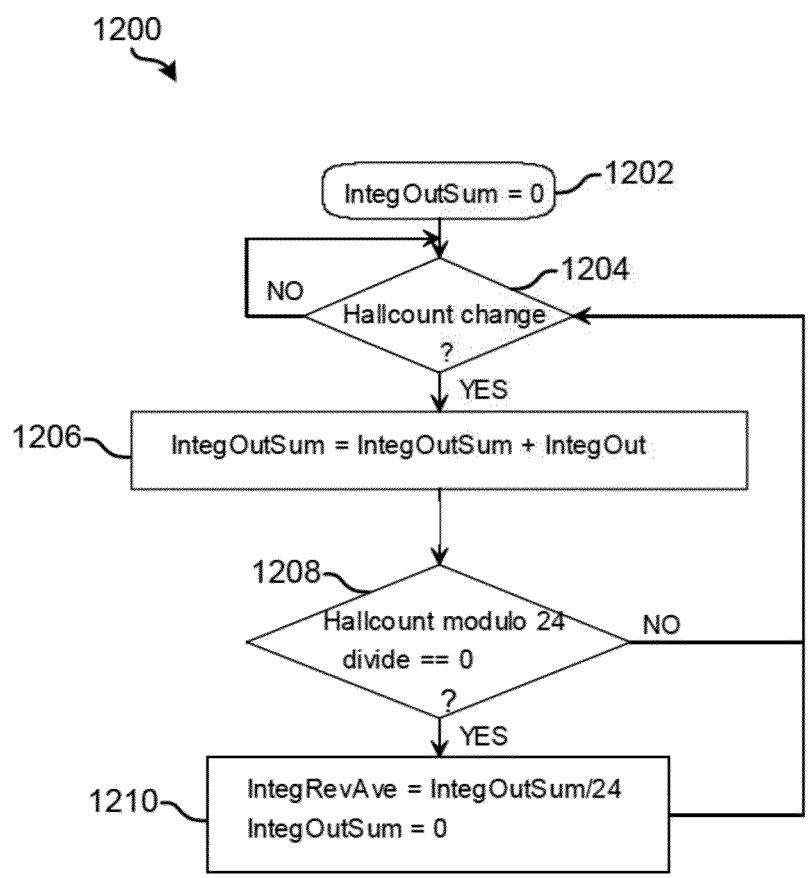
FIG. 12 is a flowchart of a method, according to one embodiment.

According to an exemplary embodiment, which is in no way intended to limit the invention, FIG. 12 illustrates a flow chart 1200 of process steps, for averaging data over 24 values corresponding to one revolution of a supply reel. As an option, the present flow chart 1200 may be implemented in conjunction with features from any other embodiment listed herein, such as those described with reference to the other FIGS. Of course, however, such flow chart 1200 and others presented herein may be used in various applications and/or in permutations which may or may not be specifically described in the illustrative embodiments listed herein. Further, the flow chart 1200 presented herein may be used in any desired environment. Thus FIG. 12 (and the other FIGS.) should be deemed to include any and all possible permutations.

Looking to FIG. 12, the flow chart 1200 includes setting the IntegOutSum to 0. See decision 1202. Moreover, decision 1204 determines whether the Hallcount has changed (e.g. if a new hall count has been reached). If the Hallcount has changed, the flow chart 1200 proceeds to operation 1206, but if the Hallcount has not changed, the flow chart 1200 repeatedly performs operation 1204 until the Hallcount has changed.

In operation 1206, the instantaneous value of the integrated signal IntegOut (e.g., see operation 1158 of FIG. 11B) is added to the previous IntegOutSum value to achieve an updated IntegOutSum.

Furthermore, decision 1208 determines whether the value of Hallcount modulo 24=0, e.g., whether a full rotation of the supply reel has been reached. If the value of Hallcount modulo 24≠0, the flow chart 1200 then returns to operation 1204 which determines whether the Hallcount has changed (e.g., if a new hall count has been reached) and again progresses through flow chart 1200 as described above. However, if the value of Hallcount modulo 24=0, the flow chart 1200 moves to operation 1210 where the average integrated value corresponding to one revolution of a supply reel (IntegRevAve) is set to the value of IntegOutSum/24. The flow chart 1200 may then return to decision 1202, where IntegOutSum is reinitialized to 0.

As a result, the value of IntegRevAve represents second data corresponding to an average value of data over 24 values, e.g., corresponding to 24 hall counts of one complete revolution of a supply reel. However, according to other embodiments, data may be averaged over a different number of values (e.g., hall counts) and/or rotations of a supply reel.

Moreover, as described above, by averaging the data plotted on the graph 1000 (e.g., the first data) over a value or values corresponding to one or more revolutions of a supply reel, the reel runout effect is removed. Thus, by successfully removing the reel runout effect, the corresponding data may desirably be representative of flange shifts of a tape being unwound from the supply reel.

Figure 13A:
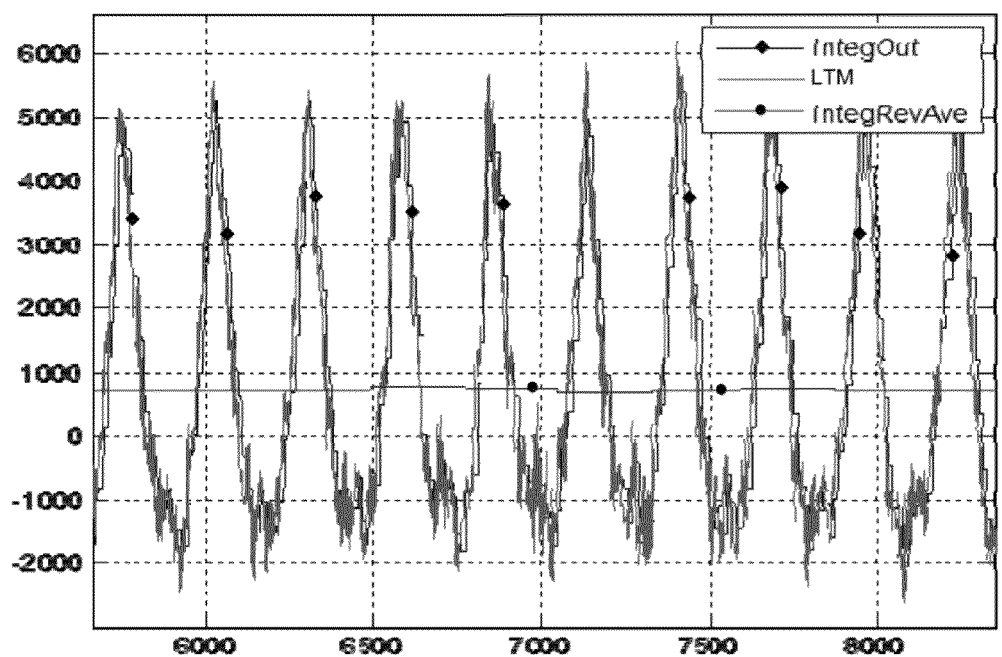
FIG. 13A is a graph of a signal, according to one embodiment.
Figure 13B:
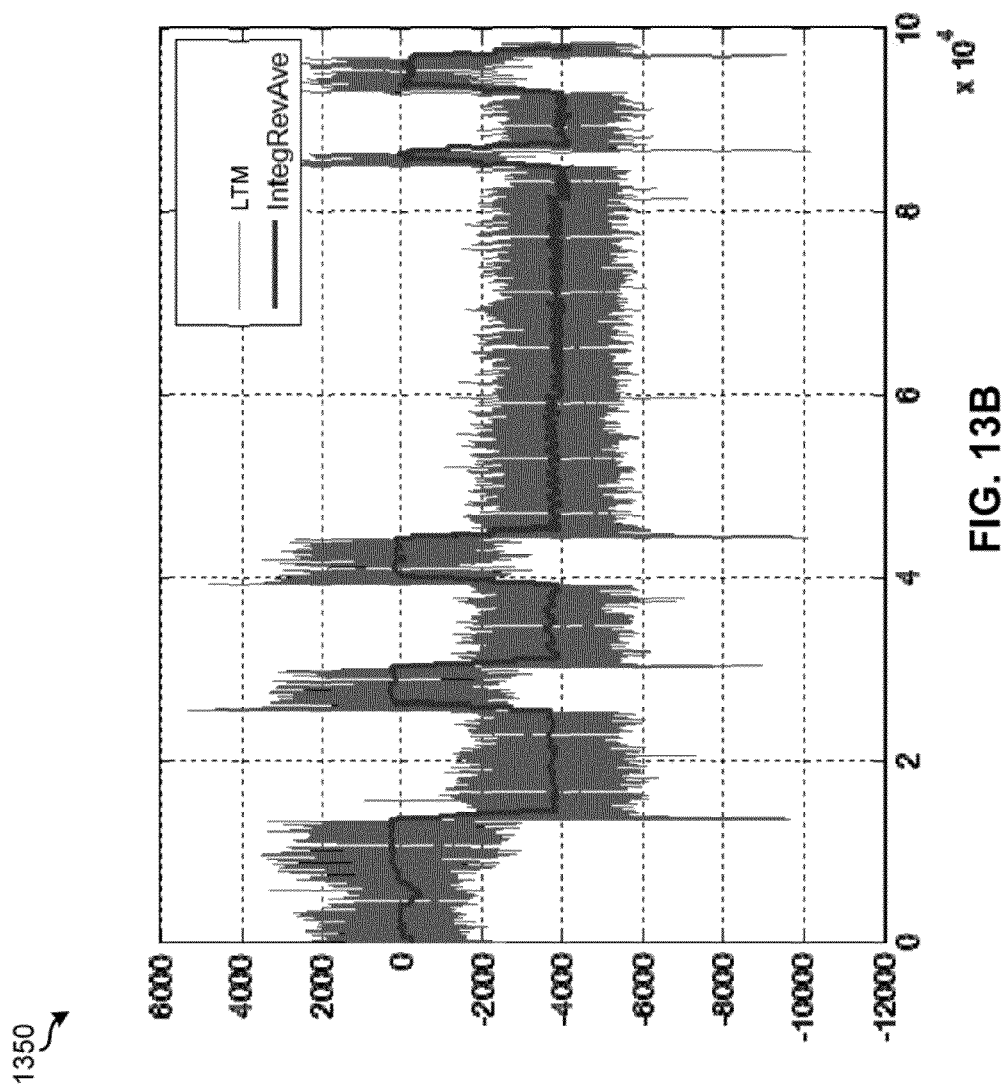
FIG. 13B is a graph with a broader representation of the signal of FIG. 13A.

Looking now to FIGS. 13A-13B, graphs 1300, 1350 illustrate the exemplary integrator signal of FIGS. 9A-9B, in addition to corresponding first and second data (e.g., IntegOut, IntegRevAve respectively) vs. number of computation cycles (x-axis). Of course, however, such graphs 1300, 1350 and others presented herein may correspond to various applications and/or in permutations which may or may not be specifically described in the illustrative embodiments listed herein.

Referring to FIG. 13A, the graph illustrates the initial LTM signal (LTM), as well as corresponding first and second data (IntegOut, IntegRevAve respectively). As described herein, the second data IntegRevAve represents the average value of the reel runout for the LTM signal over each full revolution of the supply reel. Moreover, as depicted in graph 1300, by averaging the first data, IntegRevAve effectively removes the periodical sinusoidal curve while conserving the reel runout effect on the data.

Furthermore, FIG. 13B depicts a zoomed out view of the data plotted in graph 1300, except IntegOut. Looking to graph 1350, the plotted IntegRevAve represents data corresponding to lateral tape motion (e.g., flange shifts and/or reel runout) of a tape being unwound from the supply reel.

It follows that the various embodiments described herein are desirably able to determine a preferred position of a magnetic head with respect to a tape from an LTM signal. Coarse and/or fine actuators may further be used to achieve the preferred position of the magnetic head relative to the tape. Illustrative embodiments for positioning a magnetic head based on data derived from an LTM signal are presented in co-assigned U.S. patent application Ser. No. 14/157,078 to Nhan Bui et al., filed concurrently herewith and titled COARSE ACTUATOR POSITIONING ALGORITHM, and which is herein incorporated by reference.

It will be clear that the various features of the foregoing systems and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic, software logic such as firmware, operating system, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

According to an exemplary embodiment, which is in no way intended to limit the invention, a computer program product may include a computer readable storage medium having program code embodied therewith. Moreover, the program code may be readable/executable by a controller (e.g., see 128 of FIG. 1A) to perform one or more of the operations of the method 800 illustrated in FIG. 8.

Furthermore, in other embodiments, computer program product may include a computer readable storage medium having program instructions stored/encoded thereon. Moreover, the program instructions may be executable by a controller to cause the controller to perform one or more of the operations of the method 800 illustrated in FIG. 8.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
   a controller configured to:
      receive a signal representative of a lateral position of a magnetic head in a crosstrack direction relative to a tape passing thereby;
      integrate portions of the signal representative of the lateral position of a magnetic head, the portions corresponding to fractions of one or more revolutions of a supply reel for generating first data; and
      average the first data over a value or values corresponding to one or more revolutions of the supply reel for generating second data.

2. The apparatus as recited in claim 1, wherein the first data is averaged over each revolution of the supply reel.

3. The apparatus as recited in claim 1, wherein the portions of the signal are integrated for each fraction of each revolution of the supply reel.

4. The apparatus as recited in claim 3, wherein each fraction of each revolution of the supply reel corresponds to a predefined number of hall counts.

5. The apparatus as recited in claim 1, wherein the second data is representative of flange shifts of a tape being unwound from the supply reel.

6. The apparatus as recited in claim 1, wherein the integrating the signal removes high frequency noise from the signal.

7. The apparatus as recited in claim 1, wherein the averaging the first data removes a reel runout effect that causes a shift in tape position relative to the head at a frequency directly corresponding to a rotational frequency of the supply reel.

8. The apparatus as recited in claim 1, further comprising:
   the magnetic head;
   a fine actuator configured to move the magnetic head relative to a tape; and a drive mechanism for passing the tape over the magnetic head.

9. The apparatus as recited in claim 8, further comprising a mechanism for generating the signal representative of the lateral position of the magnetic head.

10. A method comprising:
receiving a signal representative of a lateral position of a magnetic head in a crosstrack direction relative to a tape passing thereby;
integrating portions of the signal representative of the lateral position of a magnetic head, the portions corresponding to fractions of one or more revolutions of a supply reel for generating first data; and
averaging the first data over a value or values corresponding to one or more revolutions of the supply reel for generating second data.

11. The method as recited in claim 10, wherein the first data is averaged over each revolution of the supply reel.

12. The method as recited in claim 10, wherein the portions of the signal are integrated for each fraction of each revolution of the supply reel.

13. The method as recited in claim 12, wherein each fraction of each revolution of the supply reel corresponds to a predefined number of hall counts.

14. The method as recited in claim 10, wherein the second data is representative of flange shifts of a tape being unwound from the supply reel.

15. The method as recited in claim 10, wherein integrating the portions of the signal removes high frequency noise from the signal.

16. The method as recited in claim 10, wherein averaging the first data removes a reel runout effect that causes a shift in tape position relative to the head at a frequency directly corresponding to a rotational frequency of the supply reel.

17. A computer program product, the computer program product comprising a non-transitory computer readable storage medium having program code embodied therewith, the program code readable/executable by a controller to cause the controller to:
receive, by the controller, a signal representative of a lateral position of a magnetic head in a crosstrack direction relative to a tape passing thereby;
integrate, by the controller, portions of the signal representative of the lateral position of a magnetic head, the portions corresponding to fractions of one or more revolutions of a supply reel for generating first data; and
average, by the controller, the first data over a value or values corresponding to one or more revolutions of the supply reel for generating second data.

18. The computer program product as recited in claim 17, wherein averaging the first data removes a reel runout effect that causes a shift in tape position relative to the head at a frequency directly corresponding to a rotational frequency of the supply reel.

19. The computer program product as recited in claim 17, wherein the second data is representative of flange shifts of a tape being unwound from the supply reel.

20. The computer program product as recited in claim 17, wherein the first data is averaged over each revolution of the supply reel.

* * * * *